United States Patent [19]
Jones

[11] Patent Number: 6,161,639
[45] Date of Patent: *Dec. 19, 2000

[54] VEHICLE DISLODGING SYSTEM

[75] Inventor: Bernard C. Jones, HC 35, Box 5, Copenhagen, N.Y. 13626

[73] Assignees: Bernard C. Jones; Mary C. Jones, both of Copenhagen, N.Y.

[ * ] Notice: This patent is subject to a terminal disclaimer.

[21] Appl. No.: 09/335,322

[22] Filed: Jun. 17, 1999

Related U.S. Application Data

[63] Continuation of application No. 09/093,683, Jun. 9, 1998, Pat. No. 6,021,860.

[51] Int. Cl.⁷ .................................................. B62D 51/06
[52] U.S. Cl. ........................... 180/8.4; 180/8.3; 180/8.5; 280/764.1
[58] Field of Search ............................ 180/8.3, 8.4, 8.5, 180/8.6, 203; 280/763.1, 764.1, 766.1, 765.1; 254/423

[56] References Cited

U.S. PATENT DOCUMENTS

| | | | |
|---|---|---|---|
| 19,468 | 2/1858 | Hoge | 180/8.4 |
| 195,553 | 9/1877 | Adams | 180/8.4 |
| 1,229,954 | 6/1917 | Hedges | 180/8.4 |
| 1,833,288 | 11/1931 | Hedstrom . | |
| 2,222,116 | 11/1940 | Mott | 254/124 |
| 2,662,604 | 12/1953 | Henderson . | |
| 2,862,567 | 12/1958 | Dull . | |
| 2,878,882 | 3/1959 | Bernotas . | |
| 3,095,936 | 7/1963 | Walker | 180/201 |
| 3,145,796 | 8/1964 | Padula . | |
| 3,355,136 | 11/1967 | Staples | 248/352 |
| 3,860,216 | 1/1975 | Brown | 254/86 |
| 4,265,326 | 5/1981 | Lauber . | |
| 4,759,421 | 7/1988 | Brändli . | |
| 4,997,203 | 3/1991 | Jensen | 280/763.1 |
| 5,513,716 | 5/1996 | Kumar et al. . | |
| 6,021,860 | 2/2000 | Jones | 180/8.4 |

*Primary Examiner*—J. J. Swann
*Assistant Examiner*—James S. McClellan
*Attorney, Agent, or Firm*—Nixon Peabody LLP

[57] ABSTRACT

The vehicle dislodging system in accordance one embodiment in the present invention for a vehicle with a longitudinally extending vehicle frame includes a first arm and a drive system. The first arm has a first elongated section with opposing ends and a second elongated section with opposing ends. One of the ends of the first elongated section is pivotally connected to one of the ends of the second elongated section. The other end of the first elongated section is pivotally connected to the vehicle frame for rotational and longitudinal movement with respect to the vehicle frame. The drive system is connected to the vehicle frame and to the first arm and moves the first arm from a resting position adjacent the vehicle frame to an engaging position with the ground surface to move the vehicle longitudinally, either forward or to the rear.

24 Claims, 13 Drawing Sheets

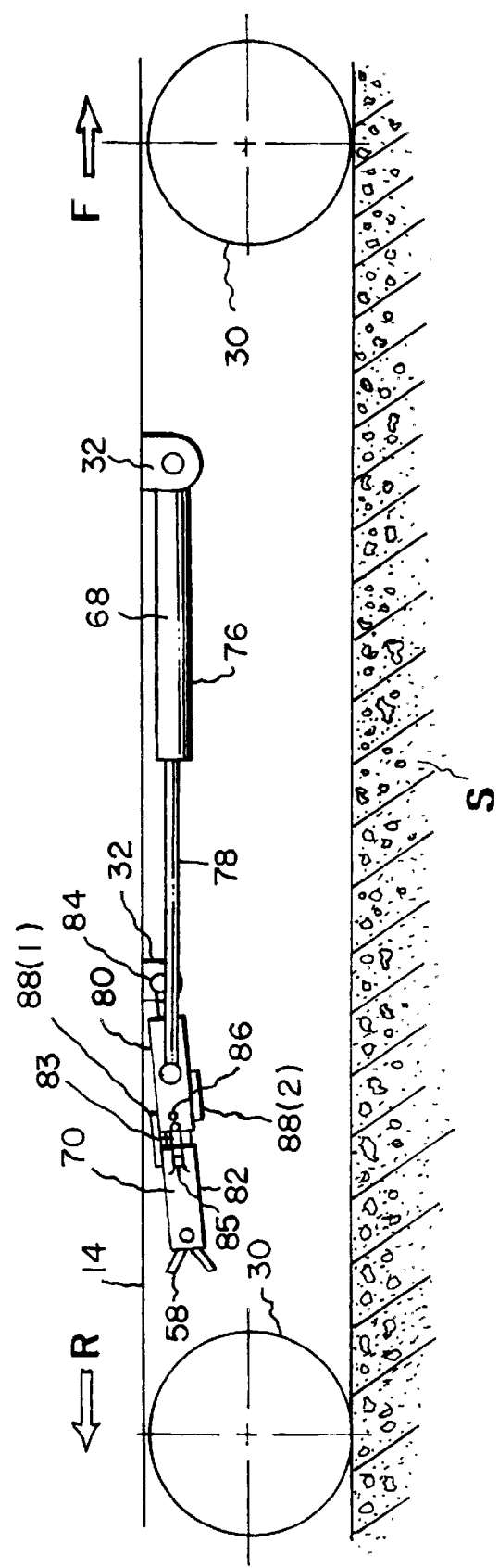

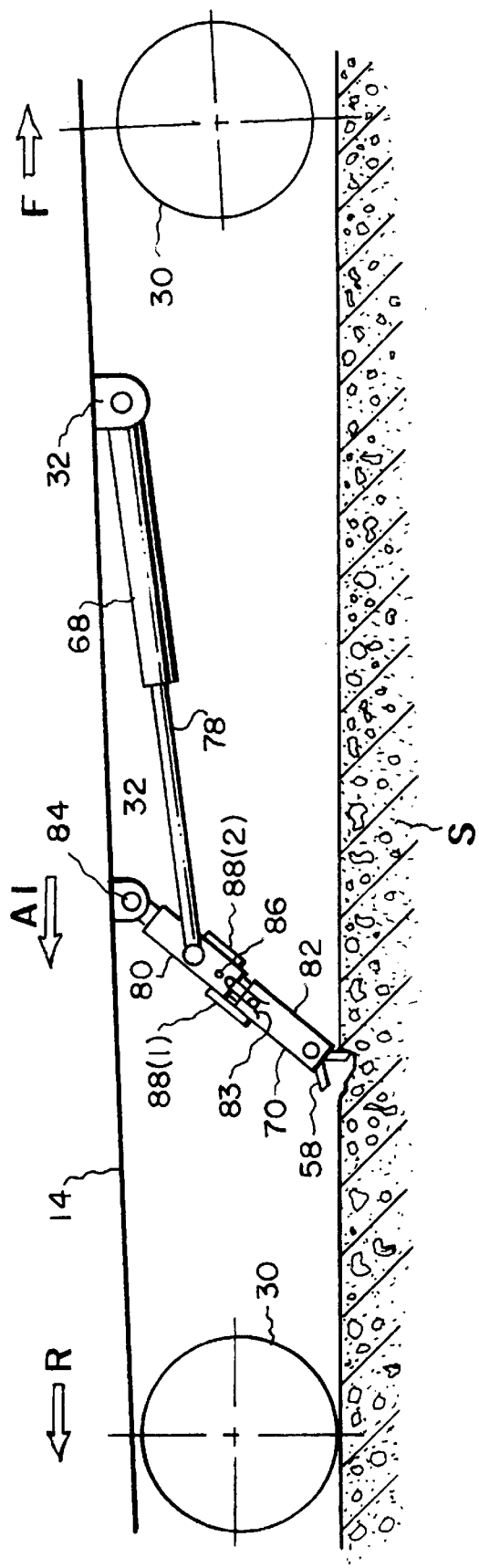

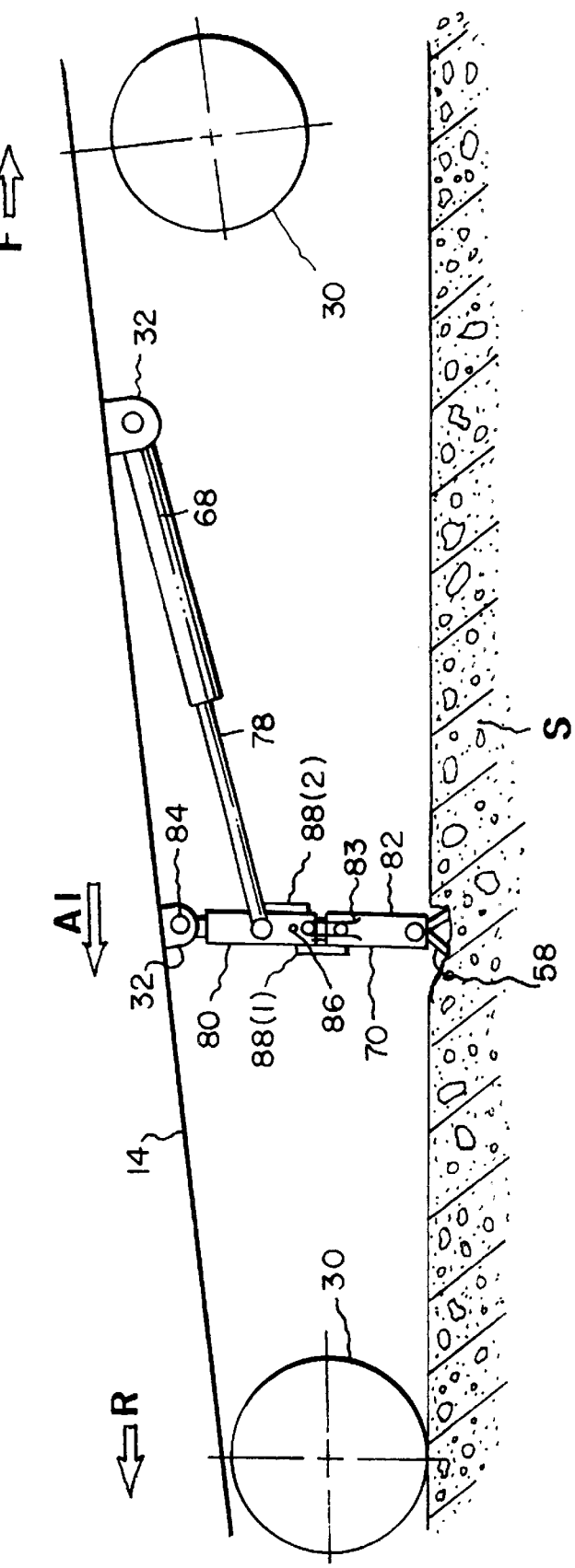

VEHICLE DISLODGING SYSTEM

This application is a continuation of U.S. patent application Ser. No. 09/093,683, filed Jun. 9, 1998, now U.S. Pat. No. 6,021,860, for Vehicle Dislodging System.

FIELD OF INVENTION

This invention relates generally to vehicles, and more particularly, to a dislodging system for a vehicle.

BACKGROUND OF THE INVENTION

For recreational and non-recreational purposes vehicles are driven in on-road and off-road conditions. On-road and, in particular, off-road conditions can vary dramatically, particularly during inclement weather, such as rain. When on-road and/or off-road conditions deteriorate, such as during rainy weather, vehicles may lose traction, sink into the ground surface, and become stuck. When this happens, the vehicles often can not dislodge themselves and need the assistance of another vehicle, such as a tow truck, to be pulled out. This process of getting a vehicle dislodged is time consuming and expensive.

Devices, such as those disclosed in U.S. Pat. No. 1,833,288 to Hedstrom, U.S. Pat. No. 2,662,604 to Henderson, and U.S. Pat. No. 2,862,567 to Dull which are all herein incorporated by reference, enable a vehicle to be shifted laterally to assist in parking the vehicle on a paved surface. These devices are not designed for dislodging vehicles which have become stuck in the ground surface and would likely sink into the ground and become inoperable.

Another devices, such as that disclosed in U.S. Pat. No. 2,878,882 to Bernotas which is herein incorporated by reference, is designed to help a vehicle regain traction on a paved surface which has become slippery, such as from ice and hard-packed snow. However, this device is not designed to dislodge a vehicle which is stuck in the ground. If the vehicle were operated on an unpaved surface and became stuck, the vehicle would likely sink far enough down that the hydraulic cylinders would also become stuck into the ground rendering them inoperable. Additionally, this device is quite complicated requiring multiple hydraulic cylinders to operate.

Another device, such as that disclosed in U.S. Pat. No. 3,145,796 to Padula which is herein incorporated by reference, is a hydraulic thruster which is used to propel a stalled vehicle incapable of self motivation. Unfortunately, when the hydraulic thruster is moved into position, the chamber of the hydraulic thruster from which the piston is driven in and out of is located perilously close to the ground surface. During attempts to dislodge the vehicle, the chamber of the hydraulic thruster may sink in and become damaged rendering the device inoperable. Additionally, to move the hydraulic thruster into position, the operator must get out of the vehicle and detach the piston end of the hydraulic thruster. This is inconvenient for the operator who will have to get out in an area which is muddy and can be dangerous because while releasing the end of the hydraulic thruster the operator might slip and fall under the vehicle which is in an unstable position.

SUMMARY OF THE INVENTION

The vehicle dislodging system in accordance with one embodiment of the present invention for a vehicle with a longitudinally extending vehicle frame includes a first arm and a drive system. The first arm has a first elongated section with opposing ends and a second elongated section with opposing ends. One of the ends of the first elongated section is pivotally connected to one of the ends of the second elongated section. The other end of the first elongated section is pivotally connected to the vehicle frame for rotational and longitudinal movement with respect to the vehicle frame. The drive system is connected to the vehicle frame and to the first arm and moves the first arm from a resting position adjacent the vehicle frame to an engaging position with the ground surface to move the vehicle longitudinally, either forward or to the rear.

The vehicle dislodging system in accordance with another embodiment of the present invention for a vehicle with a longitudinally extending vehicle frame includes a support arm, a drive arm, and a drive system. The support arm comprises a first elongated section with opposing ends and a second elongated section with opposing ends. One of the ends of the first elongated section is pivotally connected to one of the ends of the second elongated section. The other end of the first elongated section is pivotally connected to the vehicle frame for rotational and longitudinal movement with respect to the vehicle frame. The drive arm has a pair of opposing ends with one of the ends of the drive arm being pivotally connected to the vehicle frame. The opposing end of the drive arm is pivotally connected adjacent to the other end of the second elongated section of the support arm. The drive system is connected to the vehicle frame and to the drive arm and rotates the drive arm and support arm from a resting position adjacent the vehicle frame to an engaging position with the ground surface to move the vehicle longitudinally, either forward or to the rear.

The vehicle dislodging system in accordance with another embodiment of the present invention for a vehicle with a longitudinally extending vehicle frame includes a first power arm, a second power arm, a locking assembly, and a drive system. The first power arm has a pair of opposing ends with one of the ends being pivotally connected to the vehicle frame for rotational and longitudinal movement with respect to the vehicle frame. The second power arm has a pair of opposing ends with one of the ends of the second power arm pivotally connected to the other end of the first power arm. The locking assembly is connected adjacent the pivotally connected ends of the first and second elongated sections. The locking assembly has a first locked position holding the first and second power arms in an substantially straight position. The drive system is connected to the frame and to the first arm and moves the first arm from a resting position adjacent the vehicle frame to an engaging position with a ground surface to move the vehicle longitudinally, either forward or to the rear.

One of the advantages of the vehicle dislodging system is that it provides an effective, convenient and safe way to dislodge a vehicle which has become stuck in the ground surface. With one or more reward or forward thrusts in a longitudinal direction, the vehicle can be lifted to a section of the ground, partially paved, or paved surface where the vehicle can resume normal driving operations. The time and expense of getting a separate vehicle to tow the stuck vehicle out is no longer needed. Additionally, the operator of the stuck vehicle can dislodge the vehicle without ever getting out of the safety and comfort of his or her own vehicle.

Another advantage of the vehicle dislodging system is with the convenience, reliability, and simplicity of its design. When the vehicle dislodging system is not in use, the assembly can be safely tucked away adjacent to the vehicle frame so that it does not interfere with normal operations or clearance for the vehicle. When the vehicle dislodging system is in use, the driving system is safely spaced above the ground and adjacent to the vehicle frame, so that when the ground engaging components sink into the wet ground surface the driving system is still spaced above the ground surface and is not damaged. Further, the vehicle dislodging system has a much simpler design than prior vehicle shifting systems making it less expensive to manufacture and easier to install.

BRIEF DESCRIPTION OF THE DRAWINGS

FIGS. 5A–5E are side views of the embodiment of the vehicle dislodging system shown in FIG. 4A in a rearward thrust operation.

DETAILED DESCRIPTION

Figure 1A:
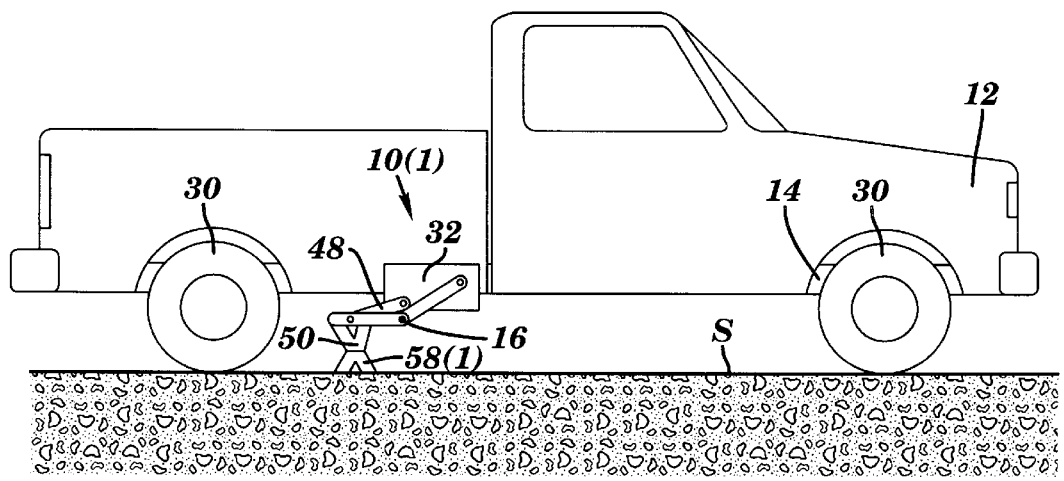
FIG. 1A is a side view of a vehicle dislodging system in accordance with one embodiment of the present invention on a vehicle.
Figure 1B:
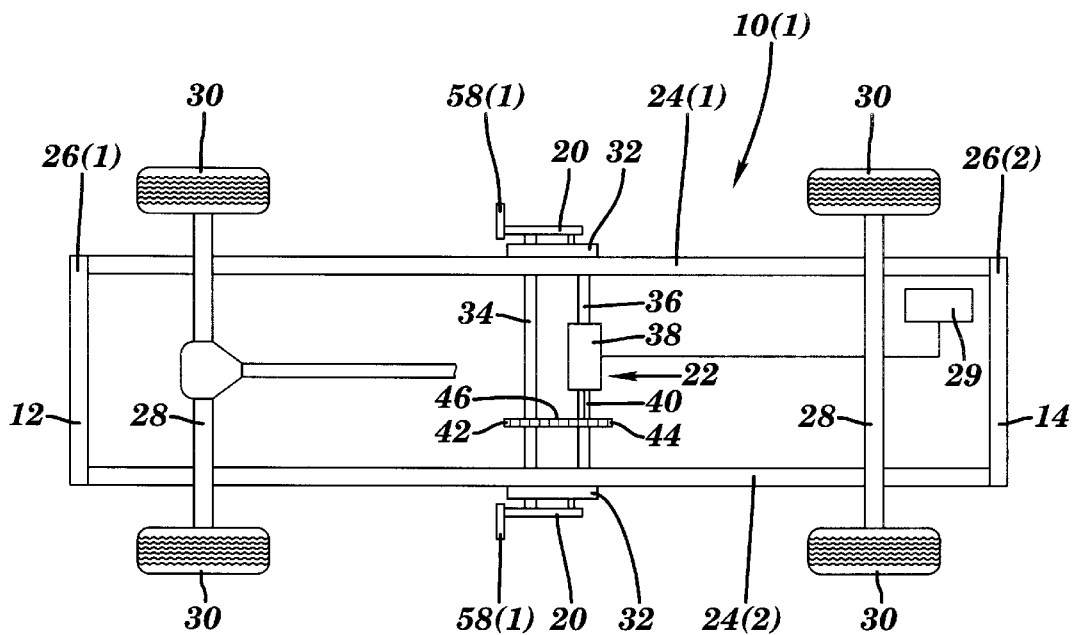
FIG. 1B is a bottom view of the embodiment of the vehicle dislodging system shown in FIG. 1A.

A vehicle dislodging system or assembly 10(1) in accordance with one embodiment of the invention a vehicle 12 is illustrated in FIGS. 1A and 1B. The vehicle 12 includes a longitudinally extending vehicle frame 14 and the vehicle dislodging system 10(1) includes a first arm 16 with first and second elongated sections 18 and 20 and a drive system or assembly 22 and may include a second arm. The vehicle dislodging system 10(1) provides a number of advantages including providing an effective, convenient and safe way to dislodge a vehicle 12 which has become stuck or has lost traction.

Referring to FIGS. 1A and 1B, one embodiment of the vehicle dislodging system 10(1) on the vehicle 12 is illustrated. Although in this particular embodiment the vehicle 12 is a pick-up truck, the vehicle dislodging system 10(1) can be mounted on any type of vehicle 12, such as an automobile, a farm tractor, a dump truck, or an all-terrain vehicle. The vehicle 12 has a longitudinally-extending vehicle frame 14 with a pair of longitudinally-extending sides 24(1) and 24(2) and a pair of laterally-extending sides 26(1) and 26(2), a pair of wheel axles 28, and four wheels 30, although the number of wheel axles 28, the number of wheels 30 and the types of wheels 30 can vary depending upon the type of vehicle 12. The axles 28 are spaced apart longitudinally and extend laterally across and are rotatably mounted to the vehicle frame 14. One wheel 30 is connected to the end of each axle 28 and each wheel 30 rests upon a surface S. These and other parts of a vehicle 12 which are not shown along with how these parts operate are well known to those of ordinary skill in the art and thus will not be described in detail here. Although in this particular embodiment, the vehicle dislodging system 10(1) is located between the axles 28, the vehicle dislodging system 10(1) can be mounted in other locations on the vehicle frame 14 as needed or desired.

In this particular embodiment, the vehicle dislodging system 10(1) has a pair of mounting plates 32, a drive shaft 34 with a pair of opposing ends, and a cross member 36 with a pair of opposing ends. One of the mounting plates 32 is secured to each of the opposing longitudinally-extending sides 24(1) and 24(2) of the vehicle frame 14. The drive shaft 34 extends laterally across the vehicle frame 14, with respect to the longitudinally-extending sides 24(1) and 24(2), with the opposing ends of the drive shaft 34 passing through and being rotatably supported by the vehicle frame 14 and mounting plates 32. The cross member 36 also extends laterally across the vehicle frame 14 with respect to the longitudinally-extending sides 24(1) and 24(2) and is secured to these sides.

Figure 1C:
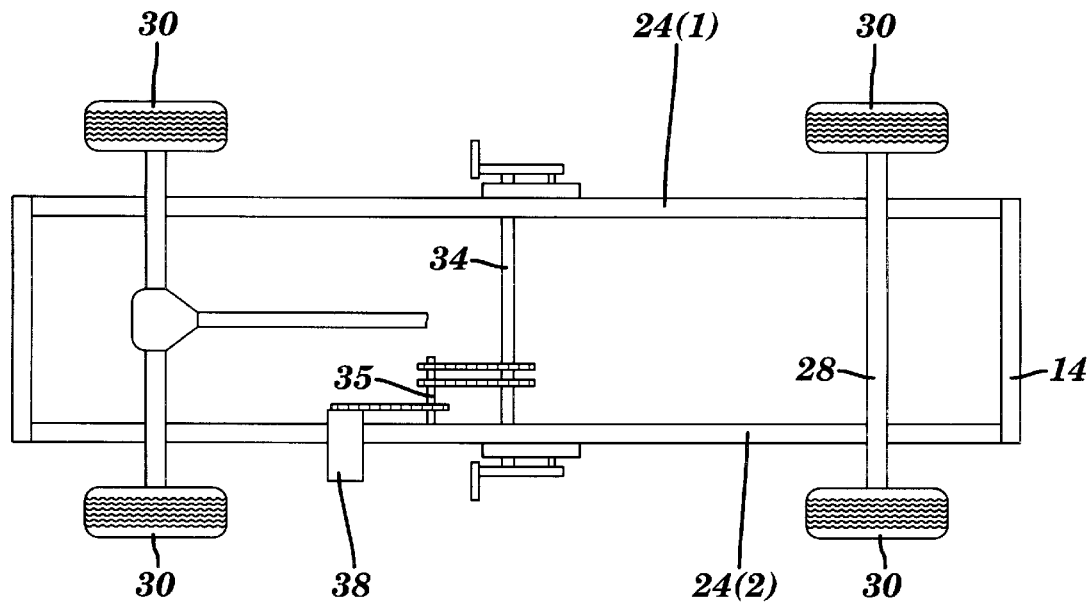
FIG. 1C is a bottom view of the vehicle dislodging system with an alternative drive system.
Figure 1D:
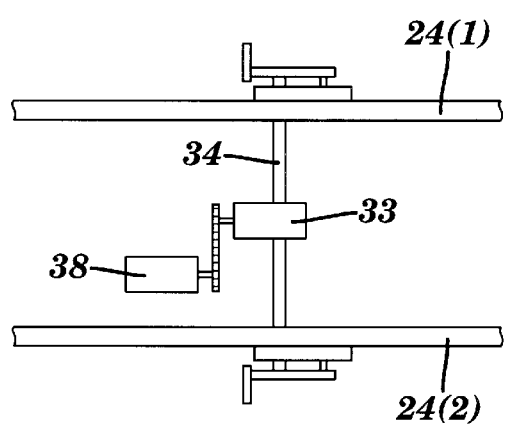
FIG. 1D is a bottom view of the vehicle dislodging system with another alternative drive system.
Figure 1E:
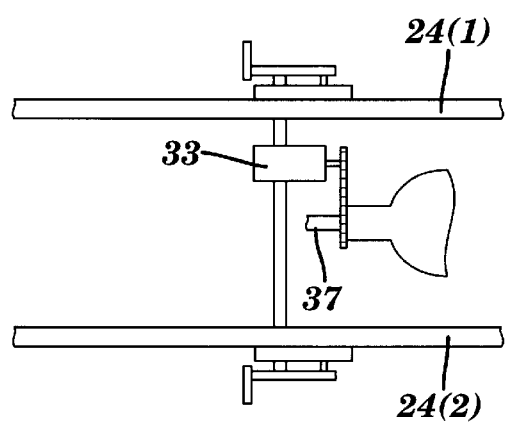
FIG. 1E is a bottom view of the vehicle dislodging system with another alternative drive system.

The vehicle dislodging system 10(1) also has a drive system 22 which in this particular embodiment includes the drive shaft 34, a motor, a motor shaft 40, sprockets 42 and 44, and a roller chain 46. The motor 38, such as a 12 volt electric motor or gas powered motor, is connected to the cross member 36 between the longitudinally-extending sides 24(1) and 24(2). The motor 38 is coupled to a power system (not shown), such as a battery, and to a control system 29 located in the vehicle 12 which controls the operation of the motor 38 including controlling when the motor 38 can be turned-on and turned-off and also controls the direction the motor 38 rotates the motor shaft 40 and the speed of the motor 38. The motor shaft 40 extends from and is driven by the motor 38. One of the sprockets 44 is formed on or connected to the motor shaft 40 and another one of the sprockets 42 is formed on or is connected to the drive shaft 34 (also shown in FIG. 2B). The roller chain 46 is seated on the sprockets 42 and 44. When the motor 38 is engaged via the control system 29, the motor 38 drives the motor shaft 40, which drives the sprocket 44 on the motor shaft 40, which pulls the roller chain 46, which engages with the sprocket 42 on the drive shaft 34 to rotate the drive shaft 34. The drive shaft 34 can be rotated either clock-wise or counterclockwise direction by the motor 38. With the control system 29, the operator never needs to get out to dislodge the vehicle 12 when it gets stuck. By way of example, one control system is disclosed in U.S. Pat. No. 2,662,604 to Henderson which is herein incorporated by reference. Referring to FIGS. 1C–1E, alternative embodiments for the drive system 22 for the vehicle dislodging system are illustrated. By way of example, in FIG. 1C a motor 38 is coupled to an intermediate shaft 35 by chains and sprockets before being coupled to drive the drive shaft 34. In FIG. 1D, a motor 38 is connected to a gear box 33 by chain and sprockets. The drive shaft 34 is incorporated into the gear box 33 and is driven by the motor 38 via the chains and sprockets. In FIG. 1E, the drive shaft 34 is also incorporated in the gear box 33 which is connected to and drive by the vehicle drive shaft 37 by chains and sprockets. As will be readily apparent to one of ordinary skilled in the art, the gear box 33 in the example in FIG. 1E can be engaged or disengaged to the vehicle drive shaft 37, by a clutching mechanism (not shown). These examples are only illustrative of some of the types of drive systems 22 which can be used.

Figure 2A:
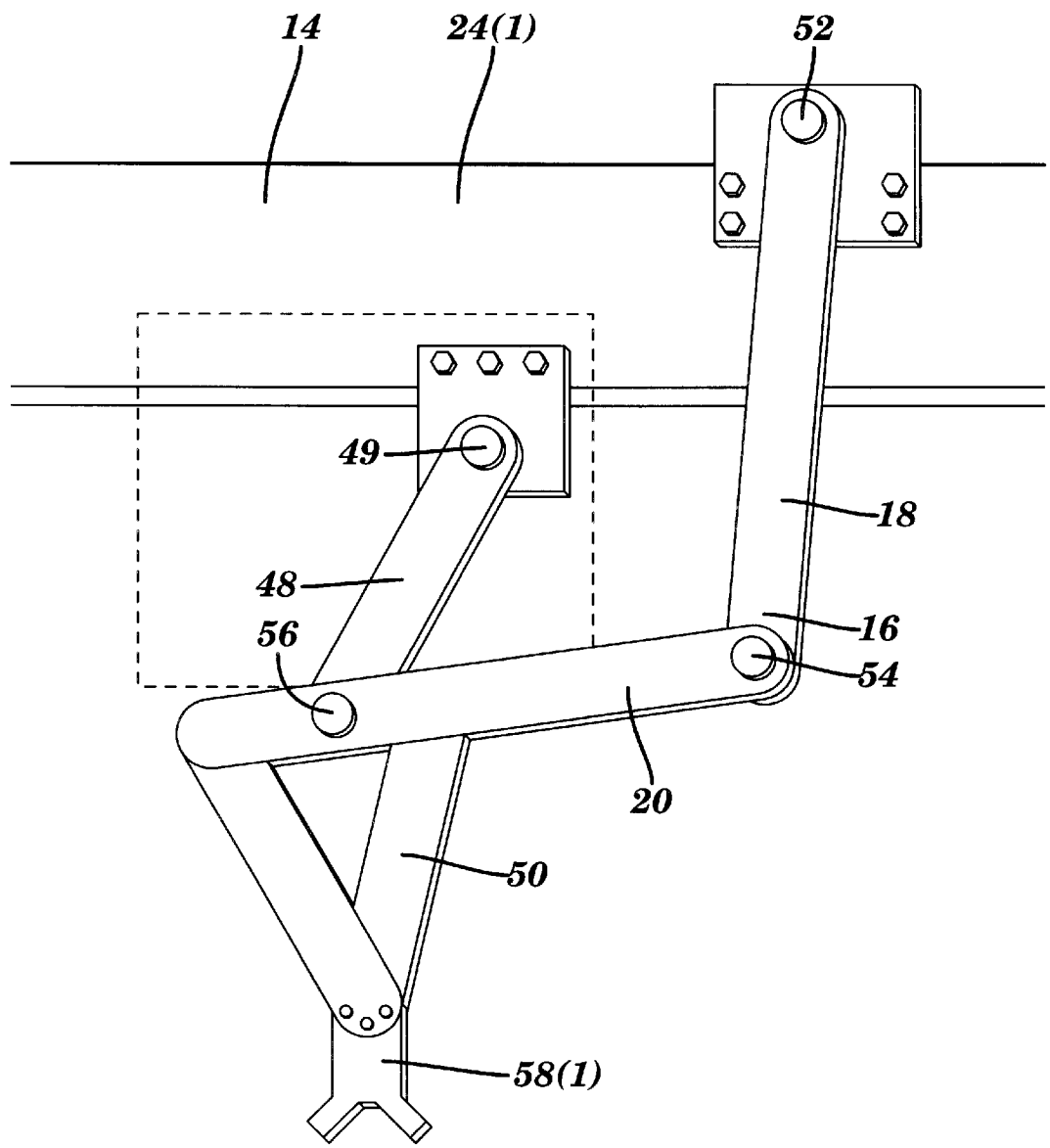
FIG. 2A is a perspective view of a drive arm and a support arm for the vehicle dislodging system shown in FIG. 1A.
Figure 2B:
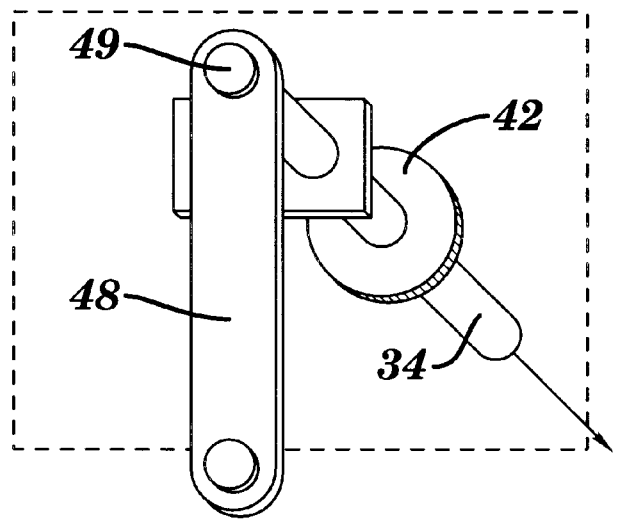
FIG. 2B is a perspective view of the drive arm and a drive shaft for the vehicle dislodging system shown in FIG. 1A.

Referring to FIGS. 1A, 2A, and 2B, the vehicle dislodging system 10(1) in this particular embodiment also has the support arm 16, the drive arm 48, and an extension 50. The drive arm 48 is connected at one end by a pin 49 or other pivoting device to the drive shaft 34 and is rotated when the drive shaft 34 rotates. The support arm 16 includes the first elongated section 18 and a second elongated section 20. The first elongated section 18 is rotatably connected at one end by a pin 52 or other pivoting device, such as a hinge or ball-and-socket joint, to the vehicle frame 14 and at the other end by a pin 54 or other pivoting device, such as a hinge or ball-and-socket joint, to one end of the second elongated section 20. The other end of the drive arm 48 is rotatably connected by a pin 56 or other pivoting device, such as a hinge or ball-and-socket joint, adjacent to the other end of the second elongated section 20 for the support arm 16. The extension 50, which in this particular embodiment has a V-shape but could have other shapes as needed or desired, is connected adjacent to the other end of the second elongated section 20 for the support arm 16 and typically extends in a direction towards the surface S. Like the drive shaft 34, the drive arm 48, and support arm 16 can be rotated either clockwise or counter clockwise in a longitudinal direction. In this particular embodiment, one drive arm 48, support arm 16, and extension 50 are located on each longitudinally-extending side 24(1) and 24(2) of the vehicle frame 14, although the system 10 could have only one drive arm 48, support arm 16, and extension 50 on one side 24(1) and 24(2) or could have more than two on either or both sides 24(1) and 24(2) if needed or desired.

Figure 2C:
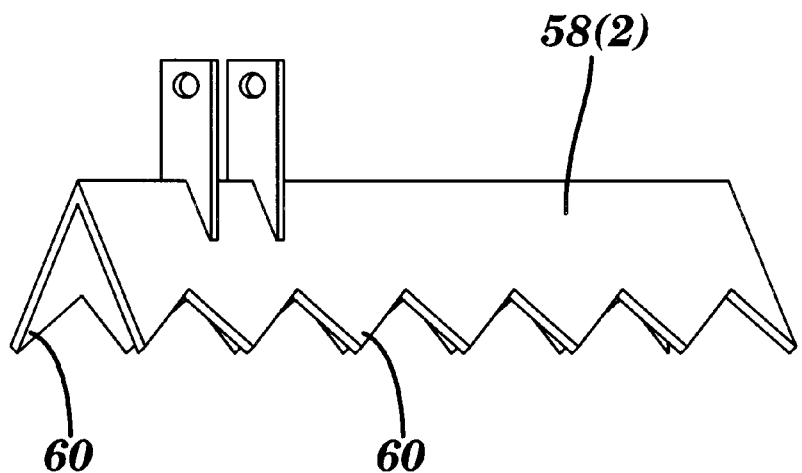
FIG. 2C is a perspective view of a shoe for the vehicle dislodging system shown in FIG. 1A.

Referring to FIG. 2A and 2C, the vehicle dislodging system 10(1) also has a replaceable shoe 58(1) which is connected to the extension in this particular embodiment. Preferably, the shoe 58(1) has a shape which will grab and hold on to the surface S when the shoe 58(1) engages with the ground. For example, as shown in FIG. 2C the shoe 58(2) may have a an upside-down, extended, V-shaped structure or a roof-shaped structure where the bottom of the V-shaped structure or roof-shaped structure has jagged edges 60 extending down towards the surface S. When the shoe 58(2) is mounted on the extension 50, the shoe 58(2) extends in a substantially lateral direction with respect to the longitudinally-extending sides 24(1) and 24(2) of the vehicle frame 14. The larger lateral surface area helps to support and move the vehicle 12 in a longitudinal direction either forward or rearward. One of the advantages of the vehicle dislodging system 10(1) is that the shoe 58 is replaceable so that if the shoe 58 is not appropriate for the current or expected conditions or wears out, the shoe 58 can be replaced. For example, the shoe 58 can be lengthened laterally to compensate for different vehicle heights.

Figure 2E:
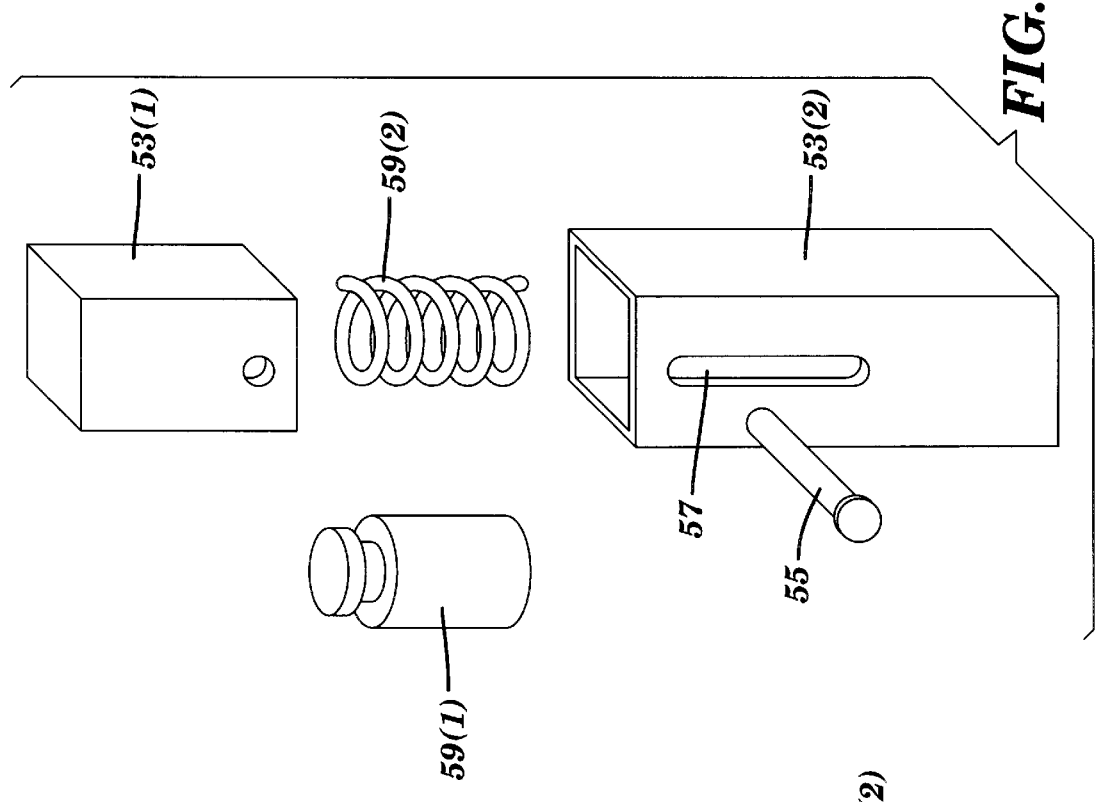
FIG. 2E is an exploded view of a portion of the shock absorber.
Figure 2D:
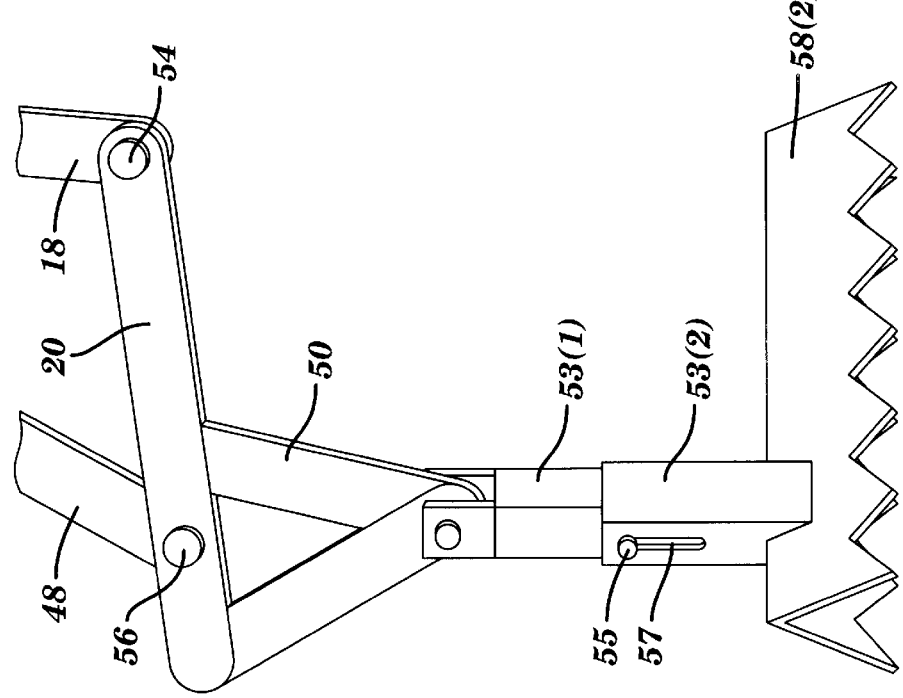
FIG. 2D is a perspective embodiment a shock absorber system for a shoe for the vehicle dislodging system.

Referring to FIGS. 2D and 2E, a shock absorber 53 which in the particular embodiment includes sections 53(1) and 53(2), a pin 55, an elongated slot 57, and a biasing device 59 may be connected between extension 50 and shoe 58. Section 53(1) fits within section 53(2) in a sliding or nested arrangement. Section 53(2) includes elongated slot 57 which is adapted to receive pin 55. The biasing device 59, such as a gas pressured cylinder 59(1) with a spring mechanism or a spring 59(2) is seated between and within sections 53(1) and 53(2) and permits these sections to expand and retract with respect to themselves as pressure is applied and removed from shoe 58. The pin 55 in slot 57 is used to hold the biasing device 59 in place. The shock absorber 53 is used with shoe 58 to help the vehicle regain traction in icy or light snow conditions. Although one example of a shock absorber 53 is shown, any type of shock absorber can be used as needed or desired.

Figure 3A:
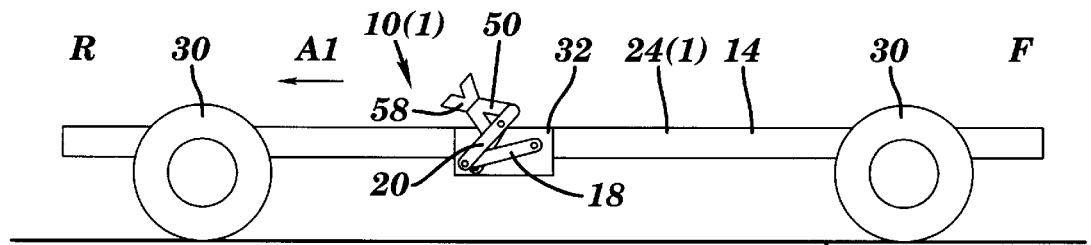
FIGS. 3A–3D are side views of the embodiment of the vehicle dislodging system shown in FIG. 1A in a rearward thrust operation.

Referring to FIGS. 3A–3D, the operation of this particular embodiment of the vehicle dislodging system 10(1) in a rearward thrust operation, i.e. to move the vehicle 12 in a rearward direction when stuck, is illustrated. The forward part of the vehicle 12 is designated F and the rearward part is designated R. Initially, the vehicle dislodging system 10(1) is illustrated in a parked or retracted position adjacent to the vehicle frame 14 as shown in FIG. 3A. In this parked position, the vehicle dislodging system 10(l) is tucked away adjacent the vehicle frame 14 so that it does not interfere with normal operation of the vehicle 12, does not cause it to lose clearance above the surface S and does not permit it to get damaged.

Figure 3B:
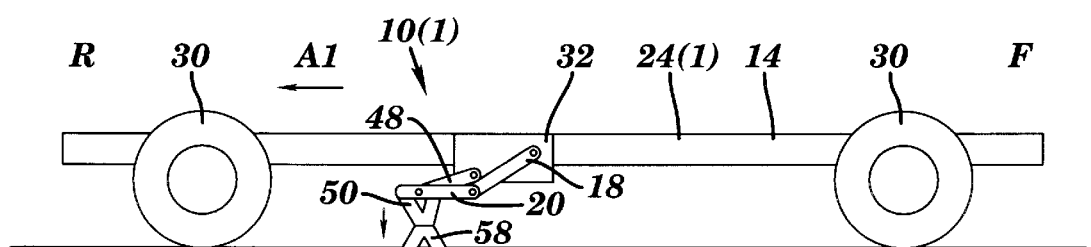

When the vehicle 12 becomes stuck in the surface S, the motor 38 is engaged via the control system 29. For a rearward thrust operation, the motor 38 drives the motor shaft 40 in a counterclockwise direction, which drives the sprocket 44 on the motor shaft 40, which pulls on the roller chain 46, which pulls on the sprocket 42 on the drive shaft 34 to rotate the drive shaft 34 in a counter-clockwise direction. The rotation of the drive shaft 34 drives the drive arm 48 in a counter-clockwise direction which drives the support arm 16 in a counter-clockwise direction and directs the extension 50 and shoe 58 towards and eventually engaging with the surface S as shown in FIG. 3B.

Figure 3C:
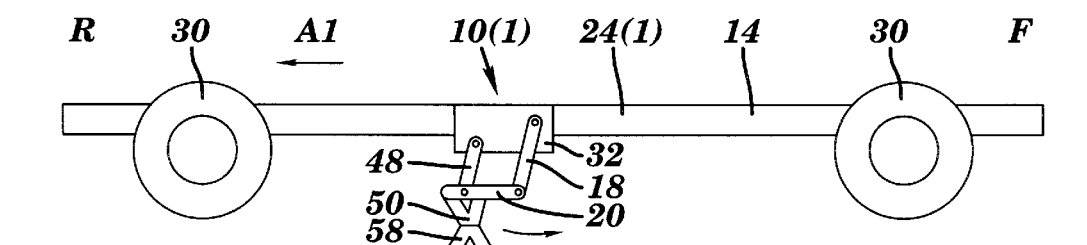

The drive arm 48 continues to be driven in a counter-clockwise direction which drives the support arm 16 in a counter-clockwise direction and the shoe 58 and possibly part of the extension 50 into the surface S. The extent to which the shoe 58 and extension 50 are driven into the surface S depends upon the condition of the surface S. The motor 38, drive shaft 34, sprockets 42 and 44, and roller chain 46 are safely spaced away from the surface S so that they will not be damaged or rendered inoperable. This movement of the drive arm. 48 and support arm 16 in a counter-clockwise direction driving the extension 50 and shoe 58 into the ground results in the vehicle 12 being lifted up and off of the surface S and begins to longitudinally shift the vehicle 12 towards the rear R as shown in FIG. 3C and indicate by arrow A1.

Figure 3D:
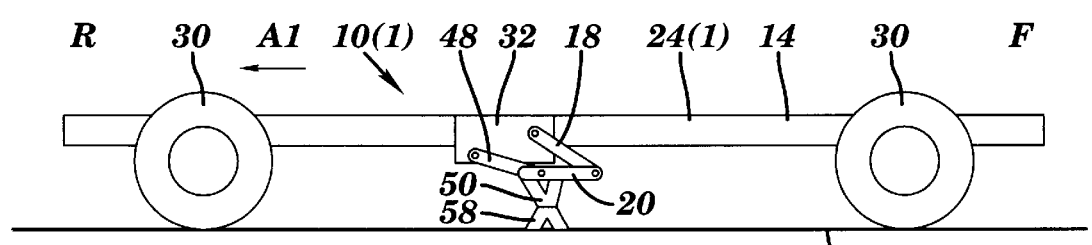

As the drive arm 48 and support arm 16 continue to rotate in a counter-clockwise direction, the vehicle 12 is lowered back down to the surface S as shown in FIG. 3D. The vehicle 12 has now been longitudinally shifted to the rear R and now may be able to resume normal driving operations. In this particular embodiment, the vehicle 12 is shifted rearward about two-feet, although this distance can vary. Meanwhile, the drive arm 48 and support arm 16 continue in a counter clockwise direction until the position shown in FIG. 3A is reached again. The vehicle dislodging system 10(1) may continue to rotate the drive arm 48 and support arm 16 in a counter-clockwise direction through the process described above to longitudinally shift the vehicle 12 rearward until the vehicle 12 can resume normal driving operations. As illustrated and described, this longitudinally shifting operation to dislodge the stuck vehicle 12 is accomplished with relatively few parts. Additionally, the operator of the vehicle 12 never needs to get out of the vehicle 12 to dislodge the vehicle 12 if it gets stuck.

The vehicle dislodging system 10(1) may also move the vehicle 12 forward F. For the forward thrust operation the steps discussed above with reference to FIGS. 3A–3D are simply reversed and the drive shaft 34, drive arm 48, and support arm 16 are rotated in a clockwise direction, instead of a counter-clockwise direction, via the drive shaft 34, sprockets 42 and 44, roller chain 46, motor shaft 40, and motor 38.

Figure 4A:
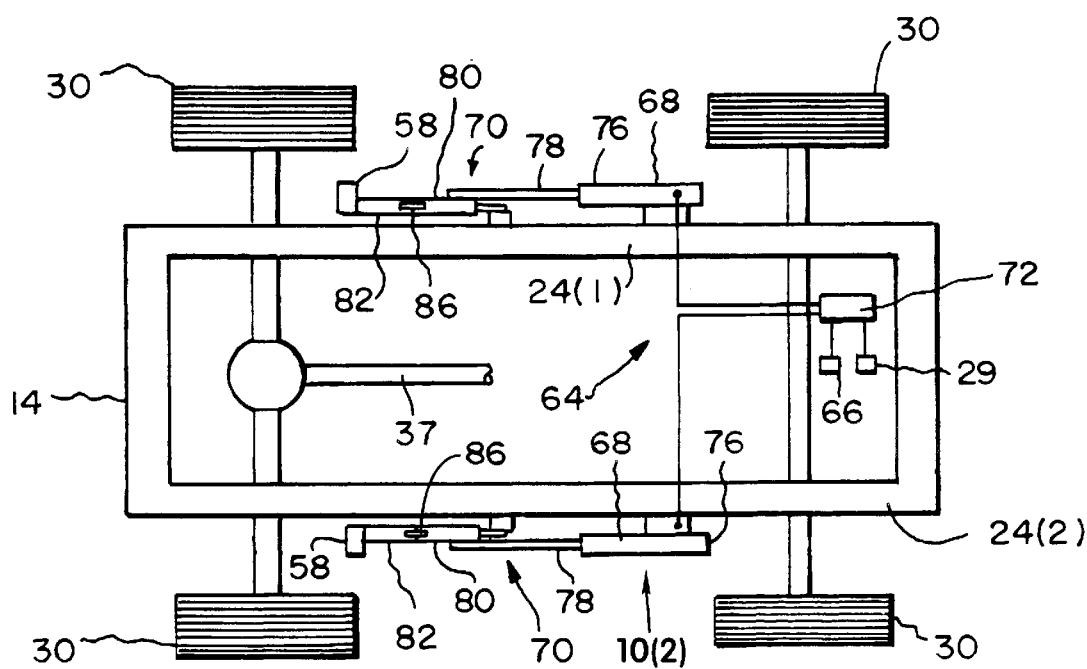
FIG. 4A is a bottom view of a vehicle dislodging system in accordance with another embodiment of the present invention.
Figure 4B:
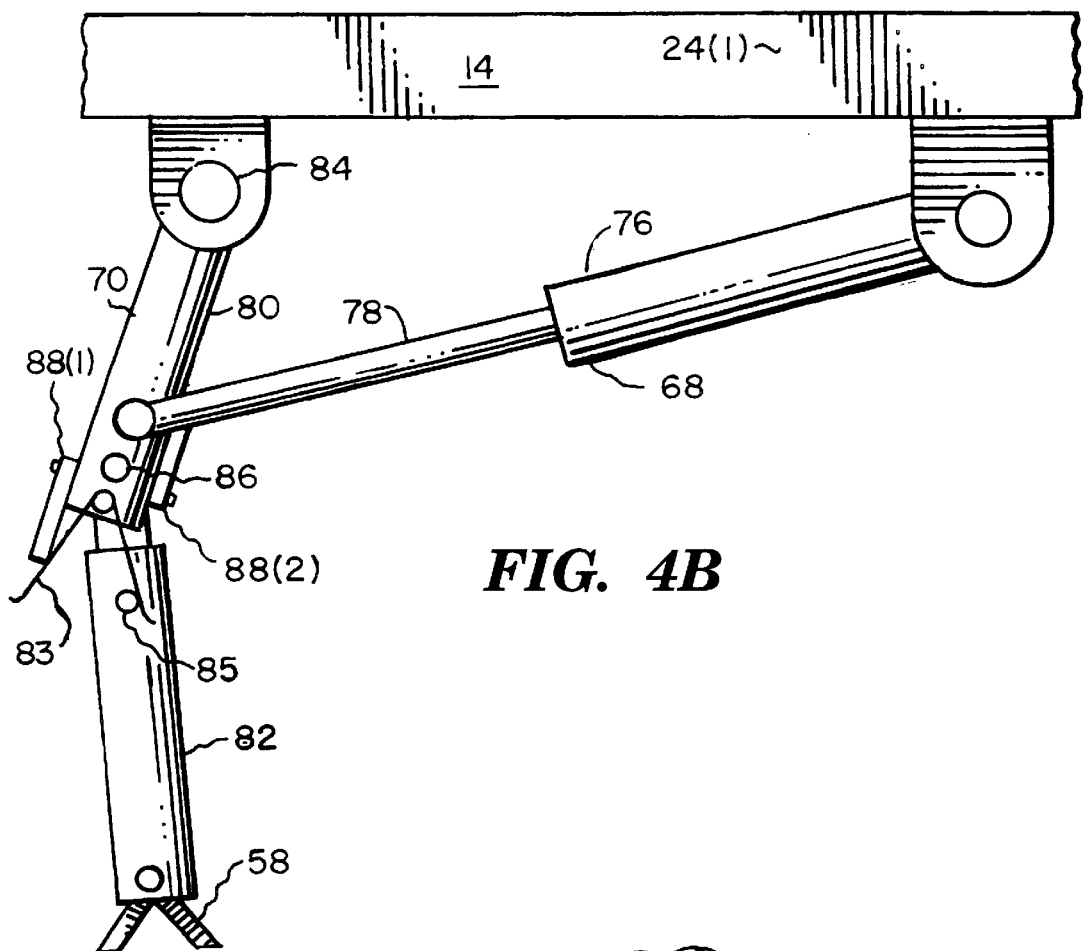
FIG. 4B is a side view of the vehicle dislodging system shown in FIG. 4A.
Figure 4C:
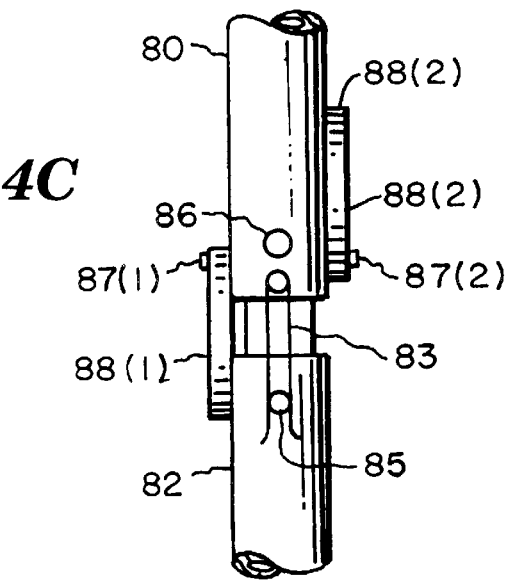
FIG. 4C is a side view of a locking assembly for the vehicle dislodging system shown in FIG. 4B.

Referring to FIGS. 4A–4C, a vehicle dislodging system 10(2) in accordance with another embodiment of the present invention is illustrated. This vehicle dislodging system 10(2) can also be mounted on any type of vehicle 12, such as the one previously described and illustrated.

The vehicle dislodging system 10(2) in this particular embodiment includes a drive system 64 which has a reservoir 66 of fluid, a hydraulic cylinder 68 for each power arm 70, a pump 72, a power system (not shown) such as a battery, and a control system 29. The reservoir 66 with the fluid is connected to the pump 72 which is connected to each of the hydraulic cylinders 68. The reservoir 66 and pump 72 are secured to the vehicle frame 14. The hydraulic cylinders 68 each include a hydraulic chamber 76 which receives the hydraulic fluid and a hydraulic piston 78. One end of each hydraulic cylinder 68 is pivotally connected to one of the longitudinally-extending sides 24(1) and 24(2) of the vehicle frame 14. Again, the control system 29 is located in the vehicle 12 and is used to control the operation of the pump 72 and motor 74, including controlling when the pump 72 is engaged or turned on to pump fluid into the hydraulic cylinders 68 to drive the hydraulic pistons 78 out, to pump fluid out of the hydraulic cylinders 68 to pull the hydraulic pistons 78 back in, or to be turned off. The parts and operation of hydraulic drive systems and control systems are well known to those of ordinary skill in the art, such as the ones disclosed in U.S. Pat. No. 2,878,882 to Bernotas and in U.S. Pat. No. 3,145,796 to Padula, which are herein incorporated by reference, and thus will not be described in detail here.

The vehicle dislodging system 10(2) also includes the power arm 70 with a first elongated section 80 with a pair of opposing ends and a second elongated section 82 with a pair of opposing ends. In this particular embodiment, one power arm 70 is located on each longitudinally-extending side 24(1) and 24(2) of the vehicle frame 14, although the vehicle dislodging system 10(2) could have only one power arm 70 and associated component parts on each side 24(1) and 24(2) or more than two power arms 70 and associated component parts on each side 24(1) and 24(2) as needed or desired. One end of the first elongated section 80 is pivotally connected to the vehicle frame by a pin 84 or other pivoting device, such as a hinge or ball-and-socket joint, and the opposing end of the first elongated section 80 is pivotally connected by a pin 86 or other pivoting device such as a hinge or ball-and-socket joint, to one end of the second elongated section 82. A spring 83 is connected to one end of elongated section 80 and extends down around both sides of pin 85 adjacent one end of elongated section 82. The spring 83, which in this particular embodiment has a U-shape biases the elongated section 82 to a straight position with respect to the elongated section 80. The spring 83 may be located on only one side of elongated sections 80 and 82 or may be located on both sides. The opposing end of the second elongated section 82 is connected to a replaceable shoe 58, such as that described earlier and illustrated in FIG. 2C.

Although one particular type of spring 83 is shown, any type of spring or biasing means can be used which will bias the elongated section 82 to a straight position with respect to elongated section 80.

The vehicle dislodging system 10(2) also includes a locking assembly 88 for each power arm 70 as illustrated in FIGS. 4B and 4C. The locking assembly 88 includes a pair of locking mechanisms 88(1) and 88(2) which can be pivoted about pins 87(1) and 87(2) to lock the elongated section 82 with the respect to the elongated section 80 so that the elongated section 82 cannot pivot in a forward direction, a rearward direction, or in either direction. As will be readily apparent to one of ordinary skill in the art, the locks 88(1) and 88(2) can be locked and unlocked either manually or automatically by a system (not shown). Although one particular type of locking assembly 88 is shown, other types of locking assemblies 88 can be used as needed or desired.

Referring to FIGS. 5A–5E, the vehicle dislodging system 10(2) in accordance with another embodiment in a rearward thrust operation, i.e. to move the vehicle 12 in a rearward direction when stuck, is illustrated. Initially, the vehicle dislodging system 10(2) is in a parked or retracted position with the first and second elongated sections 80 and 82 of the power arm 70 biased to a straight position by spring 83. In a rearward thrust operation, the locking assembly 88 locks sections 80 and 82 so that section 82 can pivot forward, but not rearward. In a forward thrust operation, the locking assembly 88 would lock section 82 with respect with to section 80 so that section 82 can pivot rearward, but not forward. Referring back to FIG. 5A, in the initial parked position the power arm 70 is tucked away adjacent the vehicle frame 14 so that it does not interfere with normal operation of the vehicle 12, does not cause it to lose clearance above the surface S and does not permit it to get damaged.

When the vehicle 12 becomes stuck in or loses traction with the surface S, the pump 72 is engaged via the control system 29. To move the vehicle 12 towards the rear R, the pump 72 draws fluid out of the hydraulic cylinder 68 on each side 24(1) and 24(2) into the reservoir 66. As fluid is pulled out of the hydraulic cylinders 68, the hydraulic pistons 78 are pulled in to the hydraulic cylinders 66. This pulls the power arms 70 which are connected to the hydraulic pistons 78 forward longitudinally with respect to the longitudinally-extending sides 24(1) and 24(2) of the vehicle frame 14. In particular, the hydraulic pistons 78 are connected to the first elongated section 80 of the power arm 70 so that the hydraulic cylinders 68 with pistons 78 remain close to the vehicle frame 14 and spaced from the surface S by at least the length of the extension of the second elongated section 82. As a result, even if the second elongated section 82 with the shoe 58 sinks deep into the surface S, the hydraulic cylinders 68 with pistons 78 will likely still be located above the surface S and be able to continue to operate. As the power arms 71) are pulled forward longitudinally they pivot or rotate about the pins 84 which pivotally connect the one end of the first elongated sections 80 to the vehicle frame 14 and eventually engage the shoes 58 and possibly part of the second elongated section 82 with the surface S as shown in FIG. 5B.

The hydraulic pistons 78 continue to pull the straightened power arms 70 which are engaging the surface S forward longitudinally. This causes the vehicle 12 to be lift(ed and shifted towards the rear R longitudinally in the direction indicated by arrow A1 as shown in FIG. 5C.

Figure 5D:
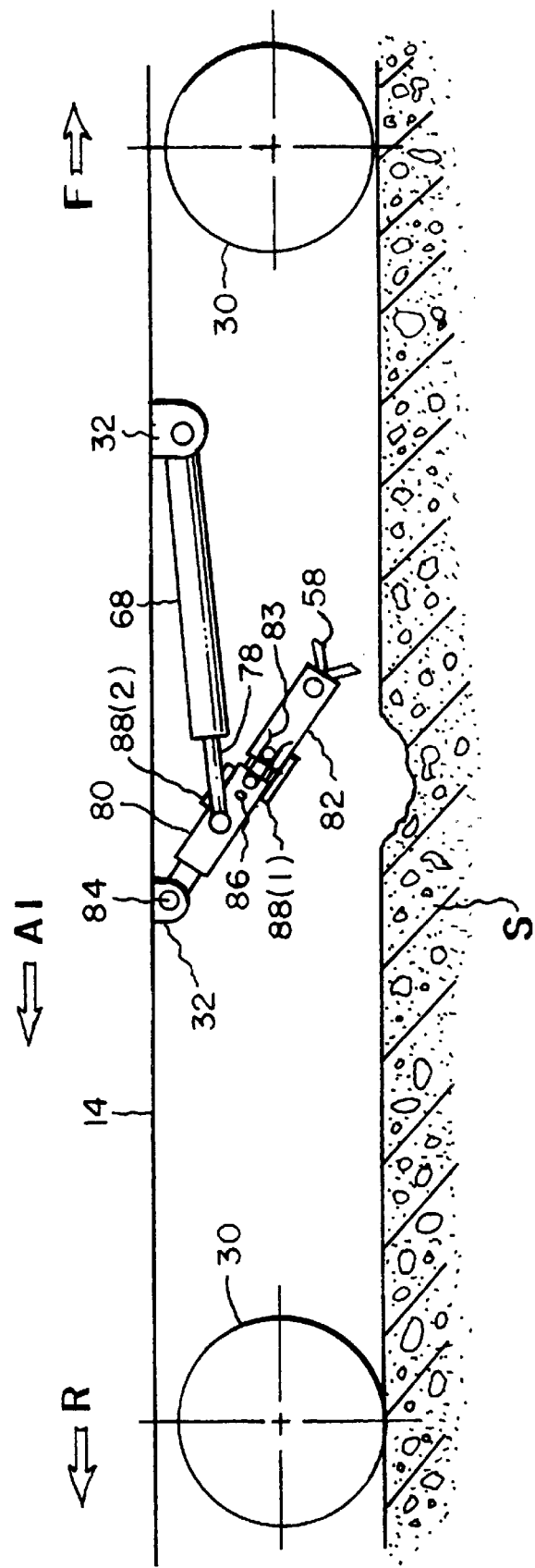
Figure 5E:
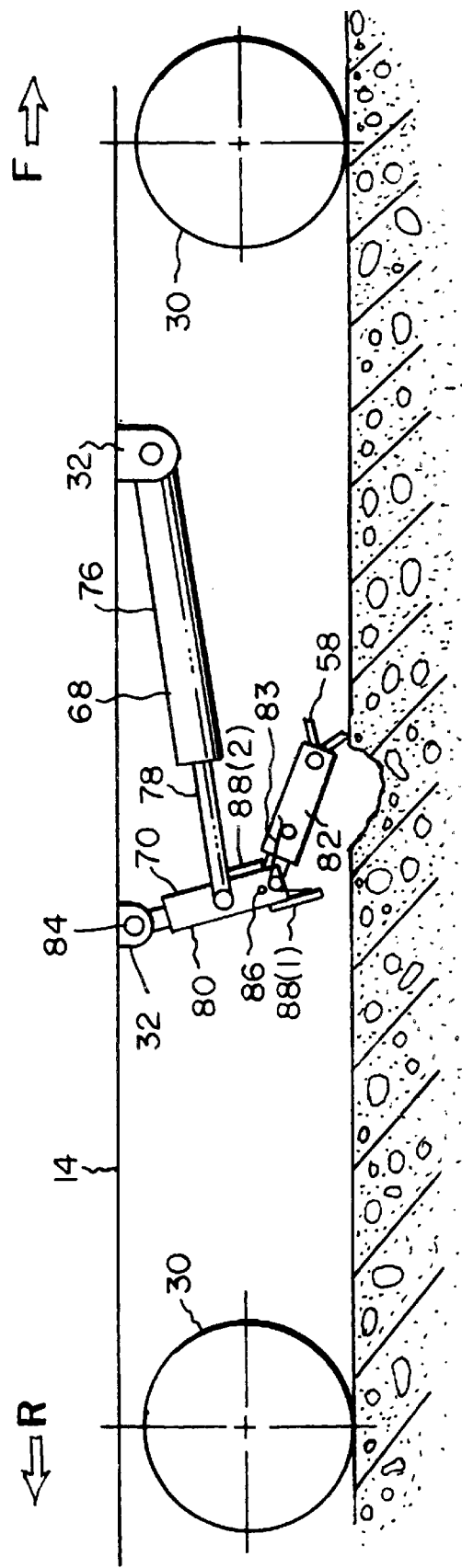

Once the power arms 70 have been pulled forward and are no longer engaging with the surface S as shown in FIG. 5D, the control system 29 then signals the pump 72 to pump fluid in the reservoir 66 back into the hydraulic cylinders 68 which drives the hydraulic pistons 78 out and the power arms 70 rearward longitudinally. As shown in FIG. 5E, the first and second elongated sections 80 and 82 are pivoted back to the rear. If section 82 engages with the surface S during this retraction, the section 82 simply pivots forward about pin 86 as shown in FIG. 5E. When section 82 clears surface S, the spring 83 biases sections 80 and 82 back to a straight position. If the vehicle 12 is still stuck at this point, the above-described process is repeated until the vehicle 12 regains traction and can resume normal driving operations. Otherwise, the first and second elongated sections 80 and 82 on each side 24(1) and 24(2) may remain in the straight and parked position as shown in FIG. 5A until needed again. As illustrated and described, this longitudinally shifting operation to dislodge the stuck vehicle 12 is accomplished with relatively few parts. Additionally, the operator of the vehicle 12 never needs to get out of his vehicle 12 to dislodge the vehicle 12 if it gets stuck.

As would be readily apparent to one of ordinary skill in the art, a forward thrust operation for the present invention would simply reverse the steps described above with respect to FIGS. 5A–5B and the direction in which locking assembly 88 locks the elongated sections 80 and 82.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A vehicle dislodging system for a vehicle with a longitudinally extending vehicle frame, the system comprising:
   a first arm comprising a first elongated section with opposing ends and a second elongated section with opposing ends, one of the ends of the first elongated section pivotally connected to one of the ends of the second elongated section, the other end of the first elongated section pivotally connected to the vehicle frame for rotational and longitudinal movement with respect to the vehicle frame;
   a drive system connected to the frame and to the first arm, the drive system moving the first arm in a longitudinal direction with respect to the vehicle frame and at substantially the same time in a vertical direction with respect to the ground surface so that the first arm is moved from a resting position adjacent the vehicle frame to an engaging position with a ground surface to move the vehicle longitudinally and at substantially the same time to lift at least a portion of the vehicle off of the ground surface; and
   an assembly connected adjacent the pivotally connected ends of the first and second elongated sections, the assembly having an encumbered position where the second elongated section is restricted from moving past a first fixed position in at least one longitudinal direction and an unencumbered position where the second elongated section can move past the first fixed position.

2. The vehicle dislodging system as set forth in claim 1 wherein the drive system comprises a hydraulic assembly comprising a reservoir of fluid, at least one hydraulic cylinder, and a pump connected between the reservoir and the hydraulic cylinder, one end of the hydraulic cylinder connected to the frame and an opposing end of the hydraulic cylinder connected to the first arm.

3. The vehicle dislodging system as set forth in claim 1 further comprising a ground engaging shoe connected to the other end of the second elongated section.

4. The vehicle dislodging system as set forth in 3 wherein the ground engaging shoe comprises a V-shaped structure which extends in a substantially lateral direction with respect to the vehicle frame.

5. A vehicle dislodging system for a vehicle with a longitudinally extending vehicle frame, the system comprising:
   a first arm comprising a first elongated section with opposing ends and a second elongated section with opposing ends, one of the ends of the first elongated section pivotally connected to one of the ends of the second elongated section, the other end of the first elongated section pivotally connected to the vehicle frame for rotational and longitudinal movement with respect to the vehicle frame;
   a drive system connected to the frame and to the first arm, the drive system moving the first arm in a longitudinal direction with respect to the vehicle frame and at substantially the same time in a vertical direction with respect to the ground surface so that the first arm is moved from a resting position adjacent the vehicle frame to an engaging position with a ground surface to move the vehicle longitudinally and at substantially the same time to lift at least a portion of the vehicle off of the ground surface; and
   a second arm, one end of the second arm pivotally connected to the frame and an opposing end of the second arm pivotally connected adjacent to the other end of the second elongated section of the first arm.

6. The vehicle dislodging system as set forth in claim 5 further comprising an extension connected adjacent to the other end of the second elongated section of the first arm.

7. The vehicle dislodging system as set forth in claim 6 further comprising a ground engaging shoe connected to the extension.

8. The vehicle dislodging system as set forth in claim 7 further comprising a shock absorber connected between the extension and the ground engaging shoe.

9. The vehicle dislodging system as set forth in claim 5 wherein the drive system comprises a motor and a drive shaft, the drive shaft connected at one end to the one end of the second arm, the motor rotating the drive shaft and the second arm when engaged.

10. A vehicle comprising:
    a longitudinally extending vehicle frame;
    a support arm comprising a first elongated section with opposing ends and a second elongated section with opposing ends, one of the ends of the first elongated section pivotally connected to one of the ends of the second elongated section, the other end of the first elongated section pivotally connected to the vehicle frame for rotational and longitudinal movement with respect to the vehicle frame;
    a drive arm with a pair of opposing ends, one of the ends of the drive arm pivotally connected to the frame and the opposing end of the drive arm pivotally connected adjacent to the other end of the second elongated section of the support arm; and a drive system connected to the vehicle frame and to the drive arm, the drive system rotating the drive arm and support arm from a resting position adjacent the vehicle frame to an engaging position with a ground surface to move the vehicle longitudinally and at substantially at the same time to lift at least a portion of the vehicle off of the ground surface.

11. The assembly according to claim 10 further comprising a ground engaging structure connected adjacent to the other end of the second elongated section of the support arm.

12. The assembly according to claim 11 wherein the ground engaging structure comprises:

an extension connected adjacent to the other end of the second elongated section of the support arm; and a shoe connected to the extension.

13. The assembly according to claim 12 wherein the shoe comprises a V-shaped structure which extends in a lateral direction with respect to the vehicle frame.

14. The assembly according to claim 10 wherein the drive system comprises a motor and a drive shaft, the drive shaft connected at one end to the one end of the drive arm, the motor rotating the drive shaft and the drive arm when engaged.

15. A dislodging assembly for a vehicle with a longitudinally extending vehicle frame, the assembly comprising:

a first arm with a pair of opposing ends, one of the ends of the first arm pivotally connected to the vehicle frame for rotational and longitudinal movement with respect to the vehicle frame;

a second arm with a pair of opposing ends, one of the ends of the second power arm pivotally connected to the other end of the first arm;

a first assembly connected adjacent the pivotally connected ends of the first and second elongated sections, the first assembly having an encumbered position where the second arm is restricted from moving past a first fixed position in at least one longitudinal direction and an unencumbered position where the second elongated section can move past the first fixed position; and a drive system connected to the frame and to the first arm, the drive system moving the first arm in a longitudinal direction with respect to the vehicle frame and at substantially the same time in a vertical direction with respect to the ground surface so that the first arm is moved from a resting position adjacent the vehicle frame to an engaging position with a ground surface to move the vehicle longitudinally and at substantially the same time to lift at least a portion of the vehicle off of the ground surface.

16. The assembly as set forth in claim 15 wherein the drive system comprises a hydraulic assembly comprising a reservoir of fluid, at least one hydraulic cylinder, and a pump connected between the reservoir and the hydraulic cylinder, one end of the hydraulic cylinder connected to the frame and an opposing end of the hydraulic cylinder connected to the first arm.

17. The assembly as set forth in claim 15 further comprising a ground engaging shoe connected to the other end of the second arm.

18. The assembly as set forth in 17 wherein the ground engaging shoe comprises a V-shaped structure which extends in a substantially lateral direction with respect to the vehicle frame.

19. A method for dislodging a vehicle comprising:

providing a first arm with a first elongated section with opposing ends and a second elongated section with opposing ends, one of the ends of the first elongated section pivotally connected to one of the ends of the second elongated section, the other end of the first elongated section pivotally connected to the vehicle for rotational and longitudinal movement with respect to the vehicle, and a drive system connected to the first arm;

a first assembly from an encumbered position where movement of the second elongated section past a first fixed position is restricted to an unencumbered position where the second elongated section can move past the first fixed position; and moving the first arm from a resting position adjacent the vehicle frame to an engaging position with a ground surface to move the vehicle longitudinally and at substantially the same time to lift at least portion of the vehicle off the ground surface.

20. The method for dislodging the vehicle as set forth in claim 19 wherein the longitudinal movement is in a forward direction.

21. The method for dislodging the vehicle as set forth in claim 19 wherein the longitudinal movement is in a rearward direction.

22. A method for dislodging a vehicle comprising:

providing a first arm with a first elongated section with opposing ends and a second elongated section with opposing ends, one of the ends of the first elongated section pivotally connected to one of the ends of the second elongated section, the other end of the first elongated section pivotally connected to the vehicle for rotational and longitudinal movement with respect to the vehicle, and a drive system connected to the first arm;

providing a second arm with one end of the second arm pivotally connected to the frame and an opposing end of the second arm pivotally connected adjacent to the other end of the second elongated section of the first arm; and moving the first and second arms to a position where the first arms engages with a ground surface to move the vehicle longitudinally and at substantially the same time to lift at least portion of the vehicle off the ground surface.

23. The method for dislodging the vehicle as set fourth in claim 22, wherein the longitudinal movement is in a forward direction.

24. The method for dislodging the vehicle as set fourth in claim 22, wherein the longitudinal movement is in a rearward direction.

\* \* \* \* \*